United States Patent Office 3,289,864
Patented Dec. 6, 1966

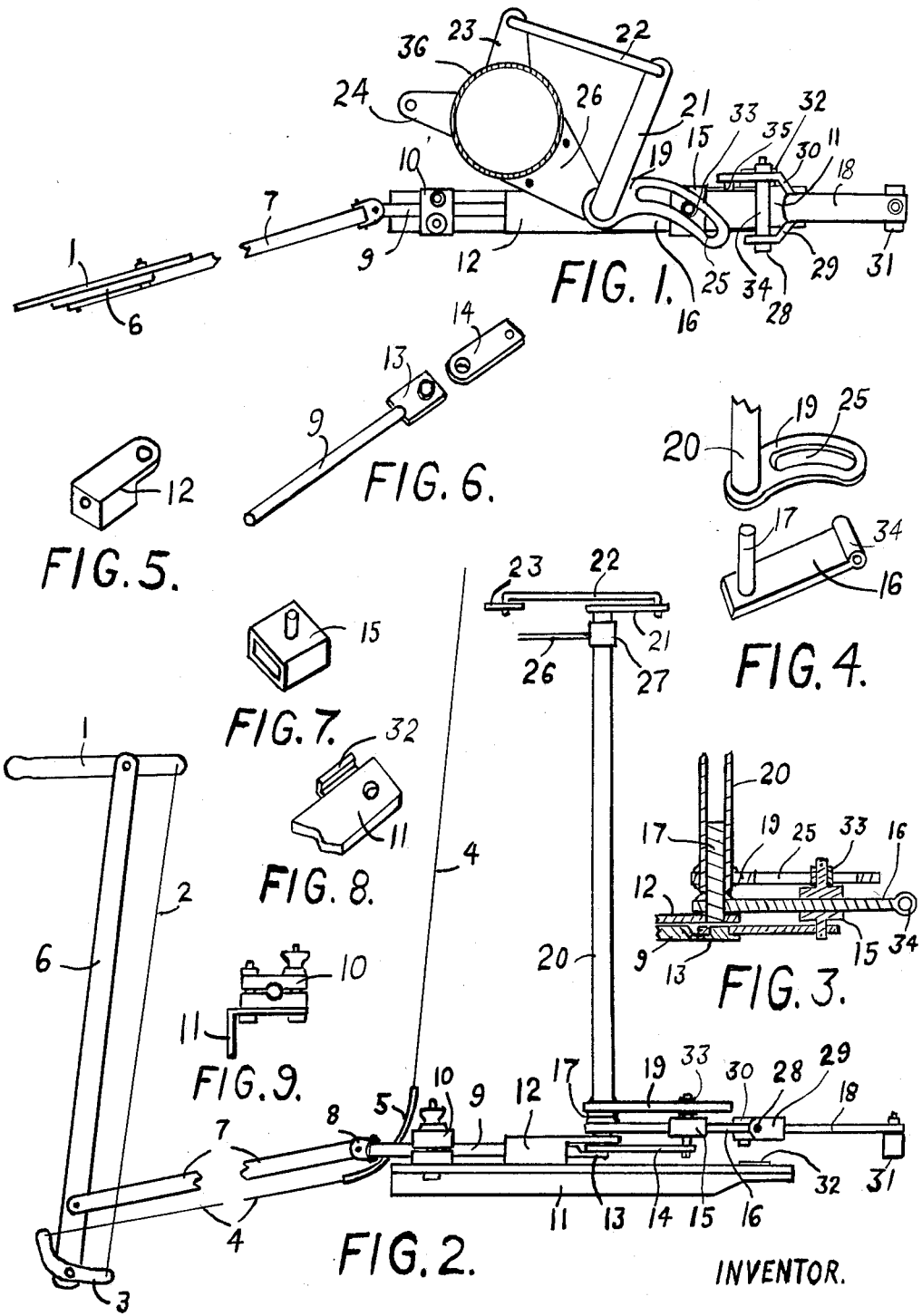

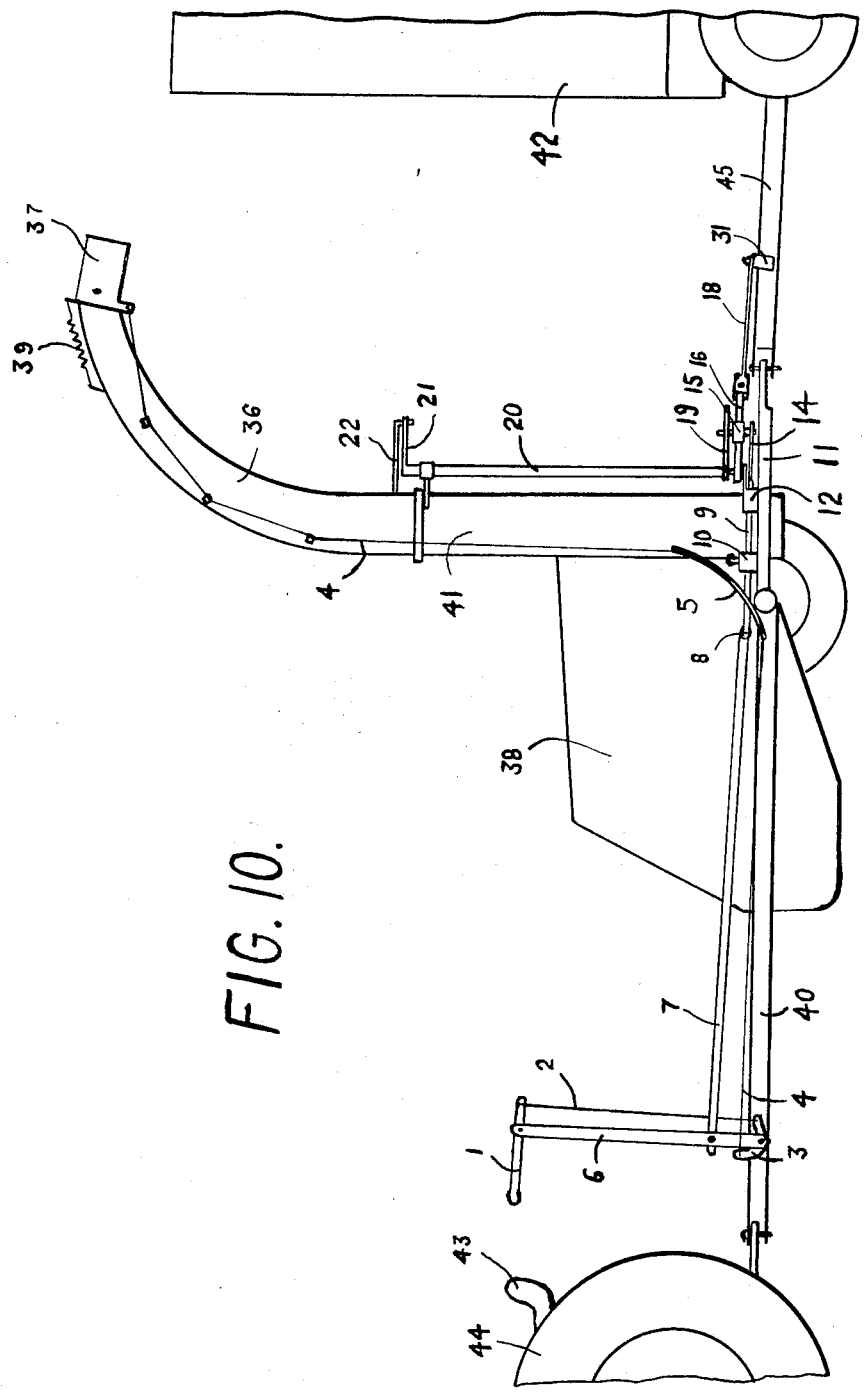

3,289,864
BLOWER PIPE CONTROL
Joseph W. Hochmuth, Musselshell County, Mont.
(Box 22, Roundup, Mont.)
Filed Dec. 30, 1963, Ser. No. 334,269
1 Claim. (Cl. 214—42)

This invention is used on a Field Chopper or Forage Harvester to regulate or adjust the blower pipe, so as to direct the chopped forage to any spot in the wagon; and it also works automatically, so when the harvester turns a corner it will automatically turn the blower pipe to deliver the forage into the wagon which is trailed behind.

The object of this invention is a manual and also automatic blower pipe control, which by holding to one lever a person can adjust the blower pipe horizontally or vertically to direct the flow of forage to any desired spot in the wagon, or it will automatically adjust the pipe horizontally when turning a corner.

FIGURE 1 is the top view of the blower pipe control.

FIGURE 2 is the side view of the blower pipe control.

FIGURE 3 is the cross sectional view of some of the main working parts of FIGURE 2 that is not shown clear with side view.

FIGURE 4 is a perspective view of the guide bar and shaft and curved adjusting arm and shaft.

FIGURE 5 is a perspective view of part of the base from FIGURE 2 which supports the shaft.

FIGURE 6 is a perspective view of the sliding shaft, with hinging end and swinging link.

FIGURE 7 is a perspective view of the sliding block and bushing.

FIGURE 8 is a perspective view of the end of the drawbar which shows how a bracket is on the one side.

FIGURE 9 is an end view of the adjustable friction drag.

FIGURE 10 is a side view showing the environment in which the control is used.

Referring now specifically to the drawing, a blower pipe control made in accordance with the present invention is shown to include a horizontal lever 1 bolted just tight enough by a lock nut and bolt to hold it firmly to vertical lever 6 and yet permit it to be pulled up and down by hand. Wire 2 is coupled to lever 3, which changes direction of pull on wire or cable 4, which is threaded thru pipe 5, which changes direction of wire again to direct it up blower pipe 36, and over to vertical deflector 37 on end of blower pipe 36. A spring 39 keeps tension on wire 4. Pipe 5 is mounted to frame of chopper 38 close to where chopper tongue 40 in hinged. The vertical lever 6 hinged to tongue 40 on chopper, is coupled to push rod 7, which couples to a universal coupling 8, which is made out of inch pipe and uses pins to couple to the sliding shaft 9, which has a short iron strap welded to the lower half of the end of the shaft. This part is 13 and in the middle of one half of it there is a ⅜ inch piece of ½ inch pipe, welded on as shown in FIGURE 6. Number 12 is the base for the parts to hinge on and is welded on top of hitch 11 that pulls the wagon 42. The hitch 11 is an angle iron mounted to the frame of the chopper. The friction drag 10 is bolted to it and is made of wood or fiber with a cushion adjustable tension. Number 14 is the swinging link that connects the sliding shaft end 13 to the sliding block 15. The sliding block fits around the guide bar 16 and slides back and forth on it. On one end of the guide bar 16 is a pipe 34 brazed on so pieces 29 and 30 which are welded on end of arm 18 form a hinge with bolt 28 through them. On the other end of arm 18 is a U iron 31 that is bolted on upside down and sets on the wagon tongue 45. On the other end of the guide bar 16 is a stub shaft 17 that extends down just through the hinge base 12 and extends up several inches into hollow shaft 20 which is a pipe. On the lower end of shaft 20 is a curved adjusting arm 19 with a curved adjusting slot 25 in it for bushing 33 to slide back and forth in. Bushing 33 is on the sliding block 15. On the upper end of shaft 20 an arm 21 has a connecting link 22 mounted to a rearwardly directing arm 23 that is mounted on blower pipe 36. Sidewise directing arm 24 is made the same as arm 23 mounted ninety degrees arounded, to be used when wagon or truck is at side of chopper. Bearing 27 and bracket 26 holds the shaft in position relative to the blower housing 41. Hinge part 30 is longer so when arm 18 is swung up out of way it will be held by wedge lock 32 and hitch 11 in a locked position. Part 35 is a metal lug projecting in on part 30 as shown in FIGURES 1 and 2. This is to prevent arm 18 from dropping down to the ground when out of place.

The operation of this device will now be explained:

When a person is operating a field chopper, he can from his seat 43 on the tractor 44, with one hand on lever 1, adjust the blower pipe to place the chopped forage to any spot in the wagon. By working lever 1 up or down it works wire 2 which works lever 3 which changes direction of pull on wire or cable 4 which runs through pipe 5 which directs wire 4 upward which then runs along blower pipe 36 to pull the hay deflector 37 that is on the end of the blower pipe 36. The deflector has a spring 39 on it to keep it pulled tight against the wire. With this a person can direct the forage vertically from bottom of wagon 42 to the high far end of it.

By pulling or pushing lever 1 which will work lever 6 which is hinged at the bottom to chopper tongue 40, it will work push rod 7 which is pinned to universal coupling 8 which changes direction more or less at different times. This coupling pulls or pushes sliding shaft 9 which works back and forth in friction drag 10 and through base 12. The sliding shaft has a flat piece welded to its lower end to make a swinging coupling as shown in parts 13 and 14 in FIGURES 2, 3 and 6. This pulls the sliding block 15 back and forth, which slides bushing 33 in arm 19. Arm 19 has a curved adjusting slot 25 in it. As bushing 33 slides back and forth through the curved adjusting slot 25 it rotates shaft 20 on shaft 17 approximately thirty degrees. This works arm 21 which works connecting link 22 which works arm 23 that is mounted on blower pipe 36 to direct forage horizontally to any spot from one side to the other side of the wagon, but only if arm 18 is placed in the locked position or U iron 31 is on the wagon tongue. This device also works automatically when arm 18 is placed on the wagon tongue with U shaped iron 31 turned over astraddle the tongue. When the chopper turns a corner, the wagon tongue is at an angle to the chopper, this swings arm 18, guide bar 16, swinging link 14, sliding block 15 and curved adjusting arm 19, which turns shafts 17 and 20, which works arm 21 and connecting link 22 and arm 23 which is mounted to blower pipe 36 to direct the pipe horizontally to follow the trailing wagon.

Number 10 friction drag has an adjustable tension to put just enough drag on sliding shaft 9 to prevent sliding block 15, from the pull of the curved slot of arm 19, from moving sliding shaft 9, back or forth.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

In combination, a mobile blower unit and trailing wagon drafted by means of a tractor coupled to the forward end of the blower unit, a swivellable blower pipe on the blower unit and a pivotal deflector at the discharge end of the blower pipe, a single control means for said blower pipe and deflector comprising; a manual lever, means mounting the lever on the forward end of the blower unit accessible to the operator, a cable or wire connected between the manual lever and deflector, a universal coupling, a push rod pivotally connecting the manual lever mounting means to the universal coupling, a swinging link, a sliding shaft extending through a friction drag and pivotally connecting the universal coupling to the swinging link, a guide bar, an arm pivotally mounted on the guide bar having an inverted U-shaped member that slidable straddles a tongue on the trailing wagon or is swung up and secured by a wedge lock, a vertically extending shaft pivotally mounted at its lower end to a stub shaft on the guide bar and rotatably mounted at its upper end to the blower pipe by hinged connecting link means, a curved adjusting arm with a curved adjusting slot secured to the lower end of the vertically extending shaft, a block slidable on the guide bar and a bushing secured to the block and slidably engaging the curved adjusting slot whereby the blower pipe is operated laterally of the trailing wagon by a back and forth movement of the manual lever and the pivotal deflector is operated to deflect the flow of material from the blower by an up and down movement of the manual lever.

References Cited by the Examiner

UNITED STATES PATENTS 2,748,958 6/1956 Moser.
2,762,517 9/1956 Eberly.
2,778,510 1/1957 Mayhill et al.
2,841,943 7/1958 Dumanowski _____ 56—16

GERALD M. FORLENZA, *Primary Examiner.*

HUGO O. SCHULZ, *Examiner.*

A. J. MAKAY, *Assistant Examiner.*